(12) United States Patent
Yanai et al.

(10) Patent No.: US 6,365,206 B1
(45) Date of Patent: Apr. 2, 2002

(54) PASTE-FORM NATTO AND A PROCESS FOR PRODUCING THE SAME

(75) Inventors: Akira Yanai; Kumi Chikushi, both of Tochigi-ken (JP)

(73) Assignee: Aduma Foods Corporation, Tochigi-Ken (JP)

( * ) Notice: Subject to any disclaimer, the term of this patent is extended or adjusted under 35 U.S.C. 154(b) by 0 days.

(21) Appl. No.: 09/638,492

(22) Filed: Aug. 15, 2000

(30) Foreign Application Priority Data

Aug. 19, 1999 (JP) ............................................. 11-232570

(51) Int. Cl.⁷ ................................................. A23L 1/211

(52) U.S. Cl. ......................................... 426/46; 426/634

(58) Field of Search ............................ 426/46, 52, 634, 426/518

(56) References Cited

U.S. PATENT DOCUMENTS 5,023,104 A * 6/1991 Nagatomo et al. .......... 426/634

OTHER PUBLICATIONS

Steinkraus, K. *Handbook of Indigenous Fermented Foods*. 2nd ed., Marcel Dekker, Inc. Pub., pp. 611–614;650, Jan. 1996.*

* cited by examiner

*Primary Examiner*—Keith Hendricks
(74) *Attorney, Agent, or Firm*—Darby & Darby

(57) ABSTRACT

Paste-form natto which has a comfortable feeling on the tongue and has little or none of the undesired properties of viscous thread, odor and bitterness of ordinary natto, and a method of producing it in which dried soybeans are dehulled and the kernels sliced to 0.1–5 mm thickness and soaked in 1.0–2.5 times their weight in water, steamed, and lumps of steamed soybean flakes are decomposed during or before seeding with commercial [*Bacillus nattol*] *Bacillus natto*. The seeded soybean flakes are fermented aerobically, aged in a chilled room to produce paste-form natto, which had a good feeling on the tongue, does not have the viscous thread, odor and bitterness of ordinary natto. The paste-form natto is packed in plastic or edible containers of any size, chilled or frozen, and shipped to food processing plants. The packed and frozen paste-form natto is not contaminated by microorganisms and is sanitary. Accordingly, it can be supplied to food manufacturing plants without leaking natto bacteria to the outside. The paste-form natto is useful to sandwiches, rice balls, sushi, etc.

21 Claims, No Drawings

PASTE-FORM NATTO AND A PROCESS FOR PRODUCING THE SAME

FIELD OF THE INVENTION

The present invention relates to paste-form natto and a process for producing paste-form natto.

BACKGROUND OF THE INVENTION AND PRIOR ART

Natto is one of the Japanese traditional foods. It typically is prepared in the prior art by fermenting whole soybeans with *Bacillus natto*, and the entire body of the soybean remains even after fermentation. Hereafter, this is called "prior art" or "ordinary natto". Natto is increasing its market in Japan every year, because it is a healthy vegetable food, and is reputed to be good for people who are suffering from high blood pressure. Some people do not like its sticky viscous thread and somewhat disagreeable odor.

Industrial scale production of santiary and microorganism free natto in paste-form is described for use in sandwiches, rice balls (onigiri), Sushi, etc. Prior art technologies for producing paste-form natto include a process for mincing or grinding the natto manufactured by the above prior art method into paste (Japanese Patent Publication No. Hei 9-75025). There also is a process for preparing paste-form natto using roasted soybean flour, called "Kinako", as raw material and then treating a mixture of the flour with water for fermentation (Japanese Patent Publication No. Hei 8-315395 and Japanese Patent Publication No. Hei 11-4662).

However, the process of mincing or grinding the natto produced by the prior art method adds cost to the production and increases the chance of contamination with undesired micro-organisms. Accordingly, mincing the ordinarily manufactured natto into paste cannot be used for commercial production of paste-form natto. Furthermore, the paste-form natto obtained by this process has all of the undesirable properties of the ordinary natto, such as viscous thread, the odor of boiled soybeans, tanned color, bitter taste and uncomfortable rough feeling on the tongue. These properties are not desirable for use in sandwiches, rice balls, "Sushi", etc.

When "kinako" (roasted soybean flour) is used as a raw material for producing paste-form natto, the natto has disadvantages, such as it takes substantial time to mix the flour with water, and it is very difficult to accomplish the fermentation. Also, aging does not occur uniformly and entirely in the kinako, because the complete culture media is not uniformly fermented, and the natto paste produced from the kinako still has almost all of the undesired properties of the ordinary natto, in addition to its kinako flavor.

BRIEF DESCRIPTION OF THE INVENTION

The present invention is directed to a novel type of paste-form natto which has a comfortable feeling on the tongue and does not have, or there is a reduction, in the undesirable properties of ordinary natto, including viscous thread, odor, and bitterness. The present invention also presents a process for manufacturing a novel paste-form natto on a commercial scale.

In the present invention, the novel form of natto is made by the process of taking dried soybeans which are dehulled and the kernels sliced to flakes, preferably having a thickness of 0.1–5 mm. The flakes are soaked in water, preferably of 1–2 ½ times the weight of the flakes. The wet soybean flakes are steamed, inoculated with a seed culture of *Bacillus natto*, cultured under aerobic fermentation conditions, and aged under cooling.

When the wet soybean flakes is inoculated with the seed culture of *Bacillus natto*, lumps of flakes produced during the step of steaming are broken up. Fermentation of the flakes inoculated with *Bacillus natto* takes place and proceeds to produce the novel paste-form natto.

The paste-form natto thus obtained is packed in containers or bags made of a plastic, such as polyethylene or polyvinyl chloride, and stored in chilled rooms or in refrigerators. The frozen end products of paste-form natto are absolutely or substantially micro-organism free and sanitary. These packed paste-form natto can be supplied to food processing plants without any chance of the natto bacteria leaking out of the product.

Appropriate flavor enhancers or spices may be added to the paste-form natto before packaging and the final product stored in refrigerators or in chilled rooms.

DETAILED DESCRIPTION OF THE PREFERRED EMBODIMENT

In the present invention, dried soybeans is used as a raw material for manufacturing the novel paste-form natto. The soybeans may be any crop of origin and in any size. Preferably, soybeans of about the same size are collected, and the hulls are removed from the soybean seeds. The soybean kernels that remain after the seed hulls are removed are sliced into pieces, hereafter called flakes, to a thickness of 0.2–5 mm, preferably 0.2–1 mm.

According to the present invention, the sliced flakes are soaked in water at room temperature in an amount of 1–2½ times the weight of the flakes for about 5 to 20 minutes, preferably 5 to 10 minutes. This amount of water as used in the present invention is much less than that used in the process of producing ordinary natto in the prior art, and the time for soaking soybeans is also much shorter than that in the process of producing ordinary natto.

The flakes are spread over the bottom of a vessel, which preferably is flat bottomed, and are steamed under a normal or an increased pressure. Steaming is usually carried out at 105°–110° C. for about 10–20 minutes under a pressure of 0.3–1.5 kg/cm². Overheating of the wet flakes at this steaming step should be avoided, because succeeding fermentation and aging process will not proceed uniformly and completely.

Normally, the steamed soybean flakes are in a form of lumps like tofu (soybean curd). The lumps are broken up, such as by kneading or applying pressure, to sizes of smaller than about 4 meshes, which correspond to one-fourth of almond grains before or during inoculation with a seed culture of *Bacillus natto*. The step of breaking up the lumps is hereafter referred to as decomposing the lumps.

The steamed flakes are inoculated with a seed culture of *Bacillus natto*, such as by spreading the culture on the bottom of the container. The inoculated flakes are then subjected to fermentation. "Inoculation" means to seed the culture media by sowing (spreading) the seed culture. A preferred form of the seed culture of *Bacillus natto* is in liquid form, and contains bacterial cells in a number of more than 100 million cells per ml, and is manufactured and sold by Miyagino Natto Co., Ltd. of Japan.

Other commercially available *Bacillus natto* may be used. It typically is in granules like sesame. This may be said to be "pre-culture" of *Bacillus natto*. Commercial scale production may start with preparation of the seed culture (pre-culture) of the micro-organism in a small scale culture media. According to the present invention, the amount of the seed culture used for the inoculation can be reduced to one-half of the amount normally used in a conventional natto manufacturing process.

If the steamed soybean flakes are not decomposed during or before the inoculation step, incomplete fermentation often may occur, mainly in the center of the batch of the flakes.

The fermentation in the present invention preferably is carried out at a temperature of 40°–50° C. for 15–20 hours under aerobic conditions. Usually, the fermentation finishes in about 17 hours. After the fermentation, the paste-form natto is obtained and is aged at 0–5° C. for 12–24 hours in a chilled room. If necessary, or desired, the paste is provided with proper taste enhancers. The product, with or without the taste enhancers, is put into plastic bags or vessels and refrigerated or frozen to form the final product.

The end product, paste-form natto obtained in accordance with the processes of the invention, has a smooth feeling on the tongue, does not have the odor of boiled soybeans and does not have the viscous threads and bitter taste which are common in the ordinary natto. It also has a pale brown color.

Consequently, the natto produced as described can be used in various foods, such as sandwiches, rice balls (onigiri), Sushi, etc., for which often considered unpleasant odor of conventional natto is not preferred. The other recommended uses for foods include milk substitute for children, confectioneries, breads, and hospital foods.

Several examples of practicing the invention follow:

EXAMPLE 1

One ton of generally uniform size of soybean seeds from which rubbish, scraps and metals, as well as pebbles were eliminated, was cleared of husk (de-hulled) and the remaining kernels of the seed sliced to flakes of 0.2 mm thickness. The flakes were soaked in 1.75 tons of water while stirring for 5–10 minutes. The wet flakes were spread on flat bottom net containers made of stainless steel, and steamed at 105°–110° C. for 15 minutes under a pressure of 0.4–0.5 $kg/cm^2$.

The wet and steamed flakes were inoculated with 0.3 cc of commercial seed culture of *Bacillus natto*. After decomposing any lumps, 2 kg of the seeded flakes were spread on a 66×42.7 cm flat bottomed net basket, covered with a sheet equipped with proper ventilation holes to avoid drying, and fermented for 17 hours at 42–50° C. under aerobic conditions. The fermented soybean flakes obtained was aged in a chill room or refrigerator at 0–5° C. for 24 hours, giving rise to paste-form natto. This was packed in plastic tubes, refrigerated and frozen for storage.

Taste test results of the paste-form natto obtained after defrosting the frozen natto are listed in Table 1. Taste test results of paste-form natto which was prepared by the same procedures as above, but without decomposing the lumps at the inoculation step are also shown in Table 1 for comparison.

Taste test results of a paste-form natto prepared by mincing or grinding ordinary natto and taste results of a paste-form natto prepared from "kinako" (roasted soybean flour) by the same process as this invention are also shown in Table 1. The defrosted natto of the present invention was changed to paste form by stirring.

As is shown in Table 1, the paste-form natto of the present invention had a smooth feeling on the tongue, did not have viscous thread, and did not have the odor and bitter taste, which ordinary natto has.

TABLE 1

|  | Ordinary Natto | Paste-form Natto From Kinako | PRESENT INVENTION Lump Decomposed | PRESENT INVENTION No Decomposition |
| --- | --- | --- | --- | --- |
| Time for soaking in water (hour) | 20 | 3 | 0.1 | 0.1 |
| Culture Period (hour) | 24 | 24 | 17 | 17 |
| Amount of Seed Culture (ml/batch) | 0.6 | 0.6 | 0.3 | 0.3 |
| Completion of Fermentation | Completed | Outer surface was fermented. Kinako remained inner part | Entirely completed | Incomplete at the bottom & inner part |
| Taste | Taste of ordinary natto. Powdery, strong natto taste, greasy | Slight sweet of Kinako powdery | No natto taste; feels mild on the tongue; not bitter, not greasy | No natto taste; feels mild on the tongue; not bitter, not greasy |
| Flavor | Natto flavor | Kinako flavor remained | No flavor | No flavor |
| Viscous thread | Viscous thread, but not strong | Viscous thread | No viscous thread | No viscous thread |
| Color | Brown natto color | Dark brown | Pale brown | Pale brown |

EXAMPLE 2

As described in Example 1, one ton of soybeans from which rubbish, scraps and metals, were eliminated were dehulled. The remaining kernels of the seeds were sliced to flakes of 0.5 mm thickness, and soaked in 1.7 tons of water for about 5–10 minutes while stirring. The soybean flakes were thinly spread on flat bottom net baskets and steamed at 105–110° C. for 15 minutes under a pressure of 0.4–0.5 kg/Cm².

The steamed soybean flakes were decomposed so that no lumps remained, inoculated with the commercial Bacillus natto, and cultured for 17 hours at 42–50° C., while avoiding too much drying by spreading a cover sheet over the fermentors. The cultured flakes obtained were changed to paste-form natto of the present invention by a slight stirring. The paste-form natto was aged in a refrigerator or chill room at 0–5° C. for 24 hours, packed in a plastic tube and cooled in a chilled room, and then frozen.

When the frozen paste-form natto was defrosted, and was tasted, it was smooth on the tongue and had no characteristic odor of ordinary natto and almost no viscous thread.

The paste-form natto which is clear or almost clear of its characteristic threadiness, odor and bitterness, is obtained by soaking dried soybeans whose kernels are sliced to flakes 0.1–5 mm thick, the flakes soaked in 1.5–2.5 times volume of water, which is succeedingly processed by steaming, decomposing lumps that have been inoculated, or inoculating during the decomposition, with bacteria fermenting aerobically and aging.

By using this invention, the amount of the inoculated bacteria is reduced to about half as compared with the process of making ordinary natto using whole soybeans (no dehulling). The paste-form natto obtained is different from ordinary natto in taste, odor, and color, and has little or none of the characteristic natto odor, threadiness and bitterness. It is also smooth to taste, and can be used as a new nutritious food material for not only the usual method in sushi and rice balls, but also in sandwiches, ablactating foods, confectioneries, bread, etc.

Specific features of the invention are shown in one or more of the drawings for convenience only, as each feature may be combined with other features in accordance with the invention. Alternative embodiments will be recognized by those skilled in the art and are intended to be included within the scope of the claims. All patent applications, patents, patent publications, and literature references cited in this specification are hereby incorporated by reference in their entirety. In the case of inconsistencies, the present description, including definitions, is intended to control. Accordingly, the above description should be construed as illustrating and not limiting the scope of the invention. All such obvious changes and modifications are within the patented scope of the appended claims.

We claim:

1. A process for producing a paste-form natto, comprising the steps of:
   slicing kernels of dried soybeans into flakes having 0.1–5 mm thickness;
   soaking the flakes in a weight of water in the range of from about 1.0–2.5 times the weight of the flakes;
   steaming the water-absorbed soybean flakes thus obtained at a temperature in the range of from about 105–110° C. for about 10–20 minutes at a pressure of from about 0.3–1.5 kg/cm² for sterilization;
   decomposing any lumps of the steamed soybean flakes;
   inoculating the steamed soybean flakes with a seed culture of Bacillus natto; and
   fermenting the steamed flakes under aerobic conditions to produce the paste-form natto.

2. A process for producing paste-form natto as claimed in claim 1, wherein said inoculation of the seed culture of Bacillus natto is performed while lumps of the steamed soybean flakes are decomposed.

3. A process for producing paste-form natto as claimed in claim 1, wherein said inoculation of the seed culture of Bacillus natto is performed after lumps of the steamed soybean flakes are decomposed.

4. The process for producing paste-form natto as claimed in claim 1, wherein said sliced soybean flakes have a thickness of 0.2–1 mm.

5. The process for producing paste-form natto as claimed in claim 1, wherein said fermenting of the soybean flakes inoculated with Bacillus natto is performed by spreading the steamed and inoculated soybean flakes on flat containers.

6. Paste form natto that has substantially no viscous threads, has a pale brown color and is not greasy.

7. The process for producing paste-form natto as claimed in claim 6 wherein said chilling is carried out at 0–5° C. for about 12 to 24 hours.

8. The process for producing paste-form natto as claimed in claim 1 wherein the step of soaking is carried out in the range from 15–20 minutes.

9. Paste-form natto that has substantially no viscous threads.

10. Paste-form natto as in claim 9 which is of a pale brown color.

11. Paste form natto as in claim 10, which is not greasy.

12. Paste form natto as in claim 11 which is free of micro-organisms other than Bacillus natto.

13. Paste-form natto made in accordance with the method of claim 1.

14. The process for producing paste-form natto as claimed in claim 1, further comprising the step of aging the paste-form natto.

15. The process for producing paste-form natto as claimed in claim 1, wherein the fermenting step is carried out at a temperature in the range of from about 40° C.–50° C. for 15–20 hours.

16. The process of claim 15 wherein the fermentation is carried out for about 17 hours.

17. Paste form natto as in claim 13 that has substantially no viscous threads.

18. Paste form natto as in claim 17 which has a pale brown color.

19. Paste form natto as in claim 18 which is not greasy.

20. Paste form natto as in claim 13 that has substantially no viscous threads, has a pale brown color and is not greasy.

21. The process for producing paste-form natto as claimed in claim 14 wherein said aging step comprises chilling the paste-form natto.

* * * * *